United States Patent [19]
Decker

[11] Patent Number: 5,270,013
[45] Date of Patent: Dec. 14, 1993

[54] REACTIVE FLUID MIXING HEAD
[76] Inventor: Herman W. Decker, P.O. Box 1106, Port Salerno, Fla. 34992
[21] Appl. No.: 879,440
[22] Filed: May 6, 1992
[51] Int. Cl.⁵ ............................................. C08F 2/00
[52] U.S. Cl. ................................. 422/133; 222/132; 239/400; 366/177
[58] Field of Search ..................... 422/133, 135, 136; 222/132, 135, 145, 136; 239/400; 366/177, 184, 194, 279, 336

[56] References Cited
U.S. PATENT DOCUMENTS

| | | | |
|---|---|---|---|
| 3,706,515 | 12/1972 | Keuerleber et al. | 425/4 |
| 4,169,545 | 10/1979 | Decker | 222/136 |
| 4,252,446 | 2/1981 | Bauer | 366/177 |
| 4,314,963 | 2/1982 | Boden et al. | 422/135 |
| 4,332,335 | 6/1982 | Fiorentini | 222/145 |
| 4,344,919 | 8/1982 | Kelterbaum | 422/133 |
| 4,397,407 | 8/1983 | Skoupi et al. | 222/132 |
| 4,399,104 | 8/1983 | Coblenz et al. | 422/133 |
| 4,471,887 | 9/1984 | Decker | 222/135 |
| 4,523,696 | 6/1985 | Commette et al. | 222/135 |
| 4,778,083 | 10/1988 | Decker | 222/145 |
| 4,860,925 | 8/1989 | Carrillon | 222/145 |
| 4,867,346 | 9/1989 | Faye et al. | 222/145 |
| 4,913,317 | 4/1990 | Wernicke | 222/145 |
| 4,993,596 | 2/1991 | Brown | 222/145 |
| 5,027,975 | 7/1991 | Keske et al. | 222/1 |

Primary Examiner—Robert J. Warden
Assistant Examiner—Hien Tran
Attorney, Agent, or Firm—Marshall & Melhorn

[57] ABSTRACT

An apparatus for mixing and dispensing two or more reactive liquids in a homogeneous stream. The device includes a mixing chamber with two or more inlets for introducing separate liquid components into the chamber, a recycle port associated with each inlet for directing unmixed components back to their source, and an outlet for dispensing mixed liquid components from the chamber. Replaceable insert nozzles direct the stream of liquid components into the chamber at a desired angle away from the outlet. A piston purges the mixing chamber of mixed fluids. A reciprocating sleeve coaxial with the shaft of the purge piston includes axial slots disposed to direct the flow of unmixed components from each inlet to its associated recycle port during purging of the mixing chamber.

11 Claims, 4 Drawing Sheets

REACTIVE FLUID MIXING HEAD

BACKGROUND OF THE INVENTION

Generally, heads for molding articles made of plastic material are known wherein the individual liquid components to be mixed are separately injected directly into a mixing chamber typically associated with a discharge duct which communicates with an associated mold. The liquid substituents to be mixed are injected into the mixing chamber through lateral orifices which open directly into the discharge duct and are directed generally normal to the flow path therethrough.

It has been found that the kinetic energy possessed by the streams of the individual liquid substituents is not completely dissipated in the mixing chamber. Consequently, the streams tend to extend into and along the discharge duct. The phenomenon results in, among other deleterious aspects, a flow of material from the discharge duct which is not thoroughly mixed. The resulting molded parts are subsequently subject to imperfections.

One of the solutions proposed for achieving complete mixing of the substituents involved is lengthening of the discharge duct to insure a complete dissipation of the kinetic energy in the streams of fluid substituents prior to the pouring or injection of the mixture into a mold cavity.

However, it has been found that lengthening the discharge duct to solve the aforedescribed problem actually introduces additional problems. Lengthening the discharge duct in the manner described above requires lengthening of the associated purge pin assembly for clearing the discharge duct between pouring cycles. The longer purge pin has additional mass, and hence greater inertia, thus requiring more operating energy to effect the desired purging operation.

SUMMARY OF THE INVENTION

It is therefore an object of the present invention to provide a device for mixing multiple reactive liquids wherein the resulting mixture is suitably homogenized and contains minimal swirling currents.

Another object of the invention is to provide a device for mixing reactive liquid components to produce a homogeneous mixture for introduction into an associated mold cavity.

Another object of the invention is to provide a mixing head for quickly and efficiently mixing reactive liquid substituents which is compact and simple in design, and which includes convenient operating adjustment means.

Yet another object of the invention is to provide such a device wherein the operating energy required to quickly and efficiently purge the discharge duct of the mixing head is minimized.

The above objects, as well as others, are typically achieved by a device for mixing and dispensing reactive fluids into a homogeneous stream and comprising a mixing chamber having at least two inlets for admitting reactive fluids, an outlet for dispensing the homogeneous stream of mixed fluids from the mixing chamber along a first path, replaceable insert means for introducing component fluids through respective ones of the inlets of the mixing chamber along respective paths angularly opposed to the flow of mixed fluids along the first path, and purge means for purging the mixing chamber of remaining reacted fluids following dispensing of a charge of the mixed fluids, and separate means for redirecting the flow of unreacted component fluids from the respective inlets back to the respective sources of the substituent fluid during the purging process.

BRIEF DESCRIPTION OF THE DRAWINGS

The above, as well as other objects and advantages of the present invention, will become readily apparent to those skilled in the art from the following detailed description of a preferred embodiment when considered in the light of the accompanying drawings, in which.

DESCRIPTION OF THE PREFERRED EMBODIMENT

Figure 1:
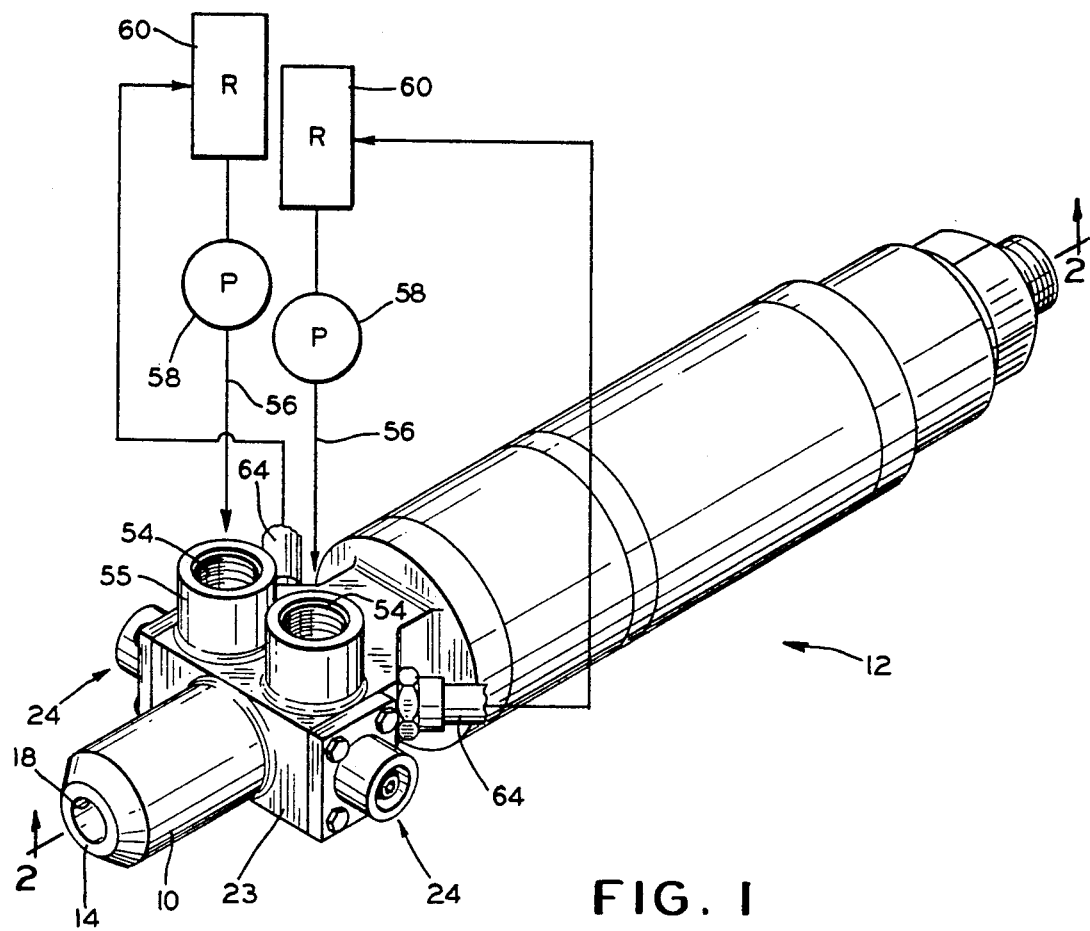
FIG. 1 is a perspective view of a mixing device constructed in accordance with the invention, together with a liquid supply circuitry shown in schematic form.
Figure 2:
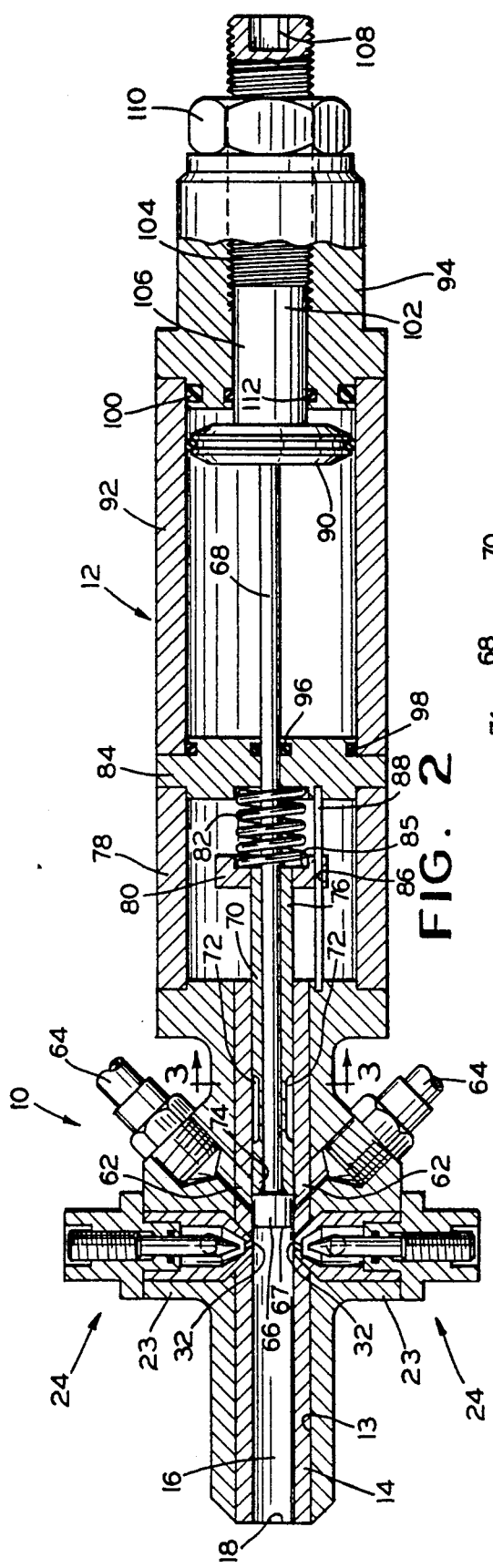
FIG. 2 is a view, partially in section, taken substantially along line 2—2 of FIG. 1, showing the device in the mixing mode.

Referring initially to FIGS. 1 and 2, the reactive fluid mixing head of the present invention includes a head frame 10 coupled to a fluid motor 12. The head frame is provided with an axially extending passage 13. A sleeve 14 is positioned within the passage 13 and extends the length of the head frame. The sleeve 14 defines a mixing chamber 16 within which component fluids are received and mixed. The mixed fluids are dispensed through an axial discharge outlet 18 at the end of the sleeve 14 most remote from the fluid motor. Two or more conically shaped inlet ports 20 are formed in the sleeve 14, with the ports 20 being spaced circumferentially around the sleeve so as to be in generally opposed positions.

Each port 20 provides communication between the mixing chamber 16 and an associated cylindrical cavity 22 formed in a boss 23 protruding from the frame 10. The cavity 22 extends inwardly into the frame 10 and terminates in a conical base merging with the conical inlet port 20 to define a continuous conical seating surface.

Figure 6:
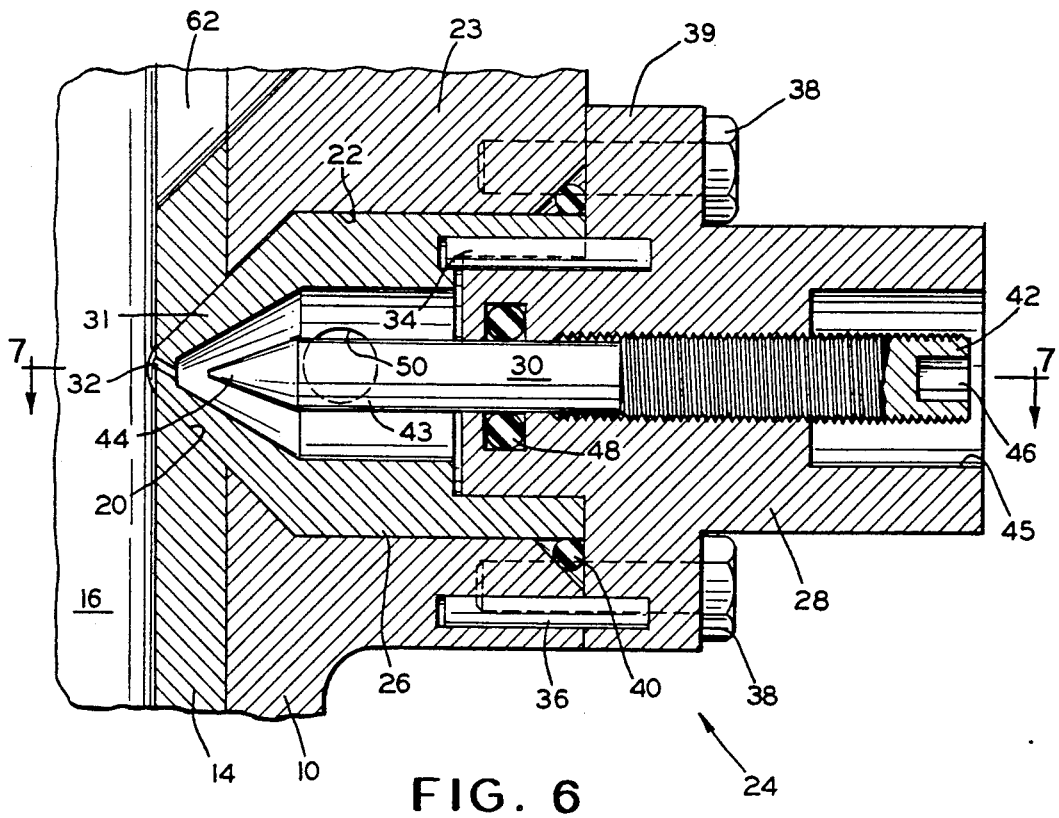
FIG. 6 is an enlarged longitudinal sectional view of an inlet and a pressure adjusting assembly illustrated in FIGS. 1, 2 and 5.
Figure 7:
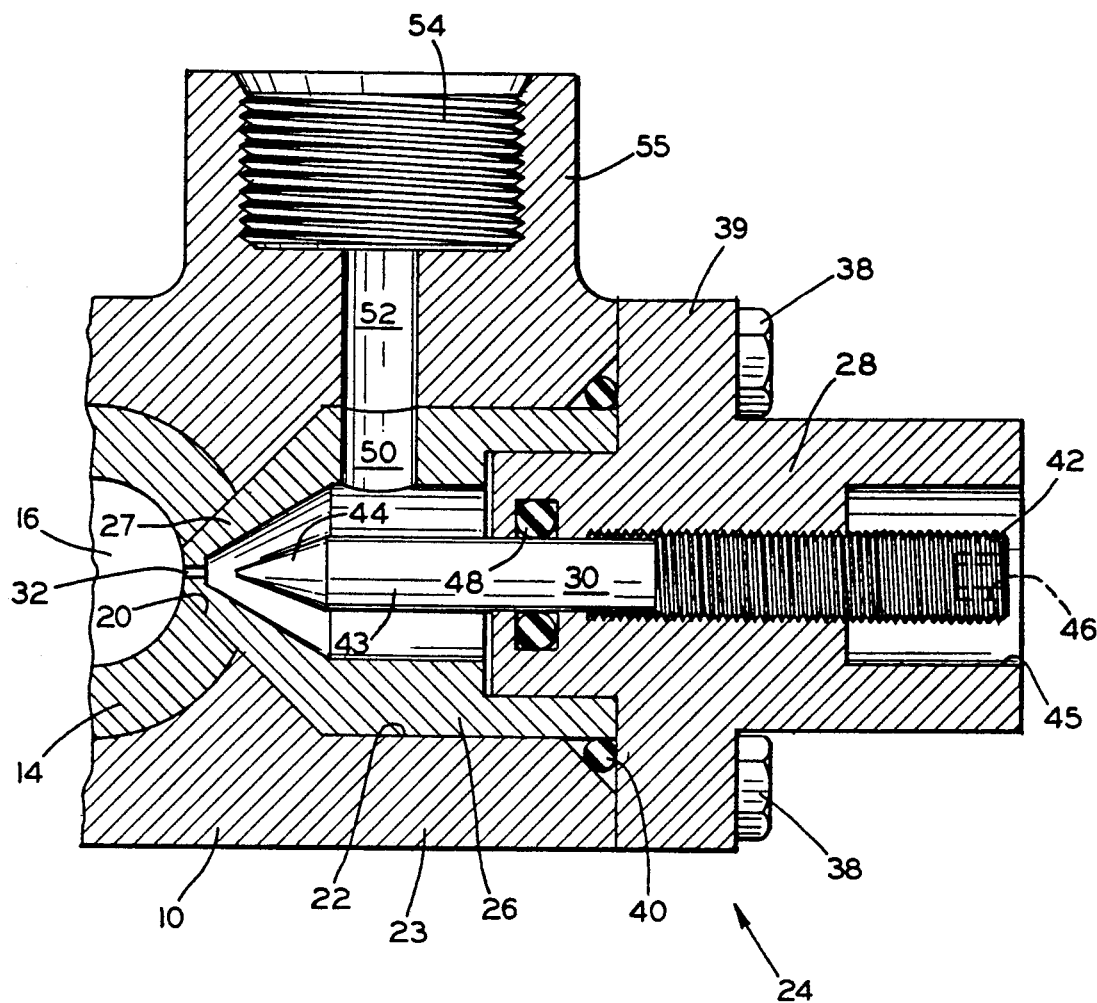
FIG. 7 is a view, partially in section, taken substantially along line 7—7 of FIG. 6, and showing the mix head fluid inlet and port insert passage.

Each cavity 22 is disposed to receive an identical pressure adjusting assembly 24. As best seen in FIGS. 6 and 7, each assembly 24 comprises a replaceable insert 26, and a valve body 28 within which a valve stem 30 is carried. The inserts 26 are generally tubular, and are configured to be received in an associated cavity 22. To that end, each insert 26 has a conical end portion 31 formed at one end. Thus, each insert 26 is received into its associated cavity 22, with the conical end portion 31 seated in the inlet port 20. As will be seen in FIG. 7, the tip of each end portion 31 is shaped to conform with the curved inner surface of the sleeve 14.

Figure 4:
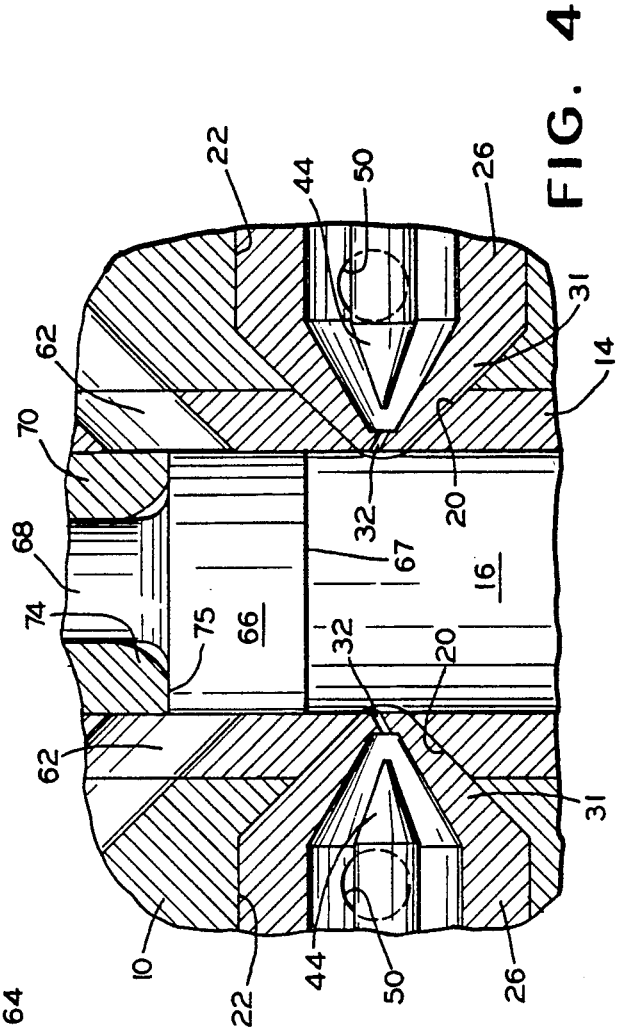
FIG. 4 is an enlarged fragmentary view of a portion of the mixing chamber and the inlets of the device shown in FIG. 2, illustrating the orientation of the passages formed in the replaceable port inserts.

A cylindrical passage 32 formed within each conical end portion 31 provides communication between the interior of the insert 26 and the mixing chamber 16. As best seen in FIGS. 2 and 4, each passage 32 is angularly disposed to direct a substituent fluid into the mixing chamber 16 in a direction somewhat upstream counter to the flow of mixed fluids and generally away from the outlet 18.

In order to assure proper orientation of each passage 32, a first alignment pin 34 is press fitted into a bore in each valve body 28 (FIG. 6). Each pin 34 is adapted to be axially slidably received in a cavity in the associated insert 26 to assure proper alignment of the insert 26 with the associated valve body 28. A second alignment pin 36 is press fitted into a second bore in the valve body 26. The pin 36 is axially slidably received in an associated cavity in the frame 10 to properly align the valve body 28 with the boss 23. The valve body 28 is secured to the boss 23 by any suitable means, such as stud bolts 38 extending through a flange 39 on the valve body 28, so as to retain the associated insert 26 in the associated cavity 22. A conventional O-ring 40 is disposed within an annular cavity formed in the boss 23, about the end of each insert 26 and beneath the flange 39 of the associated valve body 28. The O-ring 40 thus provides a fluid-tight seal between the associated valve body 28 and the boss 23.

The valve stem 30 includes a threaded rear portion 42 and an unthreaded forward portion 43 terminating in a conically shaped tip portion 44. The threaded portion 42 is threadably received within the associated valve body 28, and extends outwardly into a cylindrical recess 45 formed in the outer end of the valve body 28. The projecting end of the valve stem 30 is protected in the recess 45 from accidental damage. A drive socket 46 extends axially inwardly from the outer end of the valve stem 30. A suitable wrench (not shown) may be received in the socket 46 for rotating the valve stem 30 in an appropriate direction to cause the valve stem 30 to move axially into or out of the associated valve body 28.

A conventional O-ring 48 is disposed within an annular cavity formed in the valve body 28 about the unthreaded forward portion 43 of the associated valve stem 10. The O-ring 48 provides a fluid-tight seal between the valve stem 30 and the associated valve body 28. As will be more fully discussed below, the conical tip portion 44 of each valve stem 30 functions with the conical end portion 31 as a needle valve and may be positioned relative to the associated passage 32 to regulate the pressure of the fluid entering the passage 32. Additionally, each conical portion 44 is adapted to seat in the associated passage 32 upon appropriate advancement of the valve stem 30 for blocking fluid flow through the pressure adjusting assembly 24.

As best seen in FIG. 7, in order to admit a substituent fluid, an opening 50 is provided in the wall of each insert 26. Each opening 50 communicates via an associated inlet passage 52 with an internally threaded fluid inlet coupler 54 formed in a coupling boss 55 on the head frame 10. Referring to FIG. 1, each fluid inlet coupler 54 is adapted to have connected thereto an associated flexible conduit shown schematically at 56. Each flexible conduit 56 is connected to a pump 58 which supplies a substituent fluid under pressure from an associated reservoir 60 to the associated fluid inlet coupler 54.

Referring now to FIG. 2, recycle ports 62 are formed in the sleeve 14. Each recycle port 62 is axially spaced from an associated inlet port 20 in the direction away from the outlet 18. As best seen in FIGS. 1 and 2, the recycle ports 62 are suitably coupled by means of a connecting passageway in the frame 10 to an associated flexible conduit 64 which provides a fluid path to the associated reservoir 60.

Figure 5:
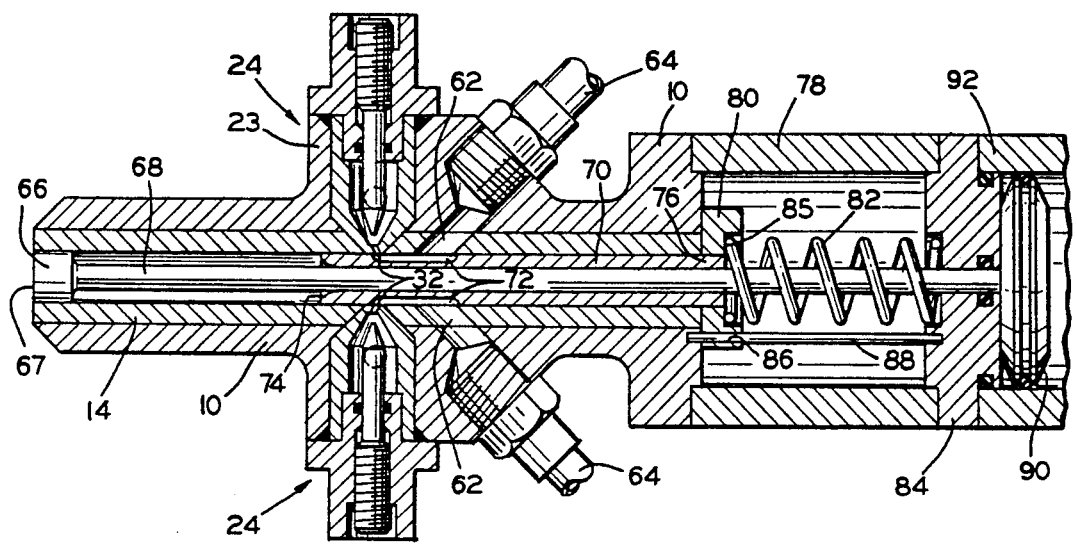
FIG. 5 is a fragmentary view of the device as shown in FIG. 2, showing the mixing device in the recycle mode.

Referring to FIGS. 2 and 5, a purge piston 66 is positioned for reciprocating axial movement within the sleeve 14. It is desirable to minimize the axial length of the purge piston 66, in order to minimize the friction and heating resulting from operation. To that end, the purge piston 66 is preferably only of sufficient length to provide the strength required to withstand the shock loadings experienced during operation hereinafter described. The purge piston 66 includes an end face 67 which defines the inner end of the mixing chamber 16, and is formed on one end of a purge shaft 68 which is of lesser diameter than the purge piston 66. At the other end, the purge shaft 68 extends into the fluid motor 12.

Figure 3:
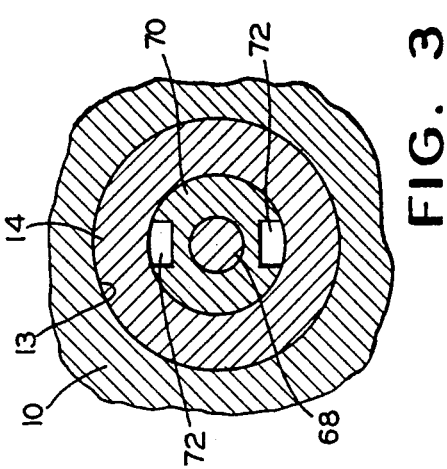
FIG. 3 is an enlarged fragmentary sectional view taken substantially along line 3—3 of FIG. 2.

The purge shaft 68 is slidingly fitted within a recycle sleeve 70. The recycle sleeve 70 is, in turn, slidingly received in the sleeve 14. Axially extending slots 72 are formed in the outer surface of the recycle sleeve 70 (FIG. 3). Each slot 72 is aligned longitudinally with an associated passage 32 and spaced from the proximal end 74 of the recycle sleeve 70 adjacent the purge piston 66. The slots 72 are of such length and are so positioned along the recycle sleeve 70 as to provide a passageway between the outlet passage 32 and the recycle port 62 when the purge piston 66 and the recycle sleeve 70 are in their fully advanced position, as illustrated in FIG. 5 and as will be hereinafter described. The face of the proximal end 74 is concave, and radiused such that it defines an annular face 75 which bears against the purge piston 66 only at the outer circumference of the recycle sleeve 70. The annular face 75 and the purge piston 66 are lapped in order to achieve a close tolerance fit between the two, allowing no circumferential gap at the outer surface of the junction.

In the retracted position the other end 76 of the recycle sleeve 70 extends out of the sleeve 14 into the interior of a tubular spacer 78 disposed between the fluid motor 12 and the head frame 10. The tubular spacer 78 is suitably affixed to both the fluid motor 12 and the head frame 10 so as to form an integral unit. A spring pedestal 80 is suitably affixed at the end 76 of the recycle sleeve 70.

The purge shaft 68 extends axially through the spacer 78. A compressed spring 82 disposed about the purge shaft 68 acts between the spring pedestal So and a guide and seal member 84 positioned between the spacer 78 and the fluid motor 12. A recessed seat 85 in the face of the spring pedestal 80 receives one end of the spring 82. The other end of the spring 82 is seated within a recess in the opposing face of the guide and seal member 84.

In order to maintain the recycle sleeve axial slots 72 in alignment with their associated passages 32, a longitudinal alignment opening 86 is through the pedestal 80. The opening 86 slidably receives an alignment rod 88. The rod 88 is affixed at its ends to the head frame 10 and the guide and seal member 84, and extends generally parallel to the purge shaft 68. This arrangement insure& that the recycle sleeve 70, and more particularly the slots 72, will remain in alignment with the passages 32 as the sleeve 70 reciprocates axially within the sleeve 14.

Referring now to FIG. 2, the fluid motor 12 comprises an extension of and is separated from the tubular spacer 78 by the disk-shaped guide and seal member 84, and includes an actuating piston 90, a tubular housing 92 which slidably receives the actuating piston 90, and a cylinder head 94. The purge shaft 68 extends through the guide and seal member 84 and is suitably affixed to the actuating piston 90. The guide and seal member 84 serves as an intermediate support for the reciprocating purge shaft 68. A conventional O-ring 96 is disposed in an annular cavity formed in the member 84 about the purge shaft 68. The O-ring 96 provides a fluid-tight seal between the member 84 and the purge shaft 68.

Suitable means (not shown) are provided for affixing the guide and seal member 84 to the inner end of the housing 92 and the cylinder head 94 to the outer end of the housing 92. A reduced diameter section of the member 84 extends axially into the housing 92. A conventional O-ring 98 disposed in an annular cavity formed by a groove on the radially outwardly directed surface of the extension cooperates with the inner surface of the housing 92 to provide a fluid-tight seal between the housing 92 and the guide and seal member 84. Similarly, a reduced diameter section of the cylinder head 94 extends axially into the housing 92. A conventional O-ring 100 disposed in an annular cavity formed in the radially outwardly facing surface of the extension cooperates with the inner surface of the housing 92 to provide a fluid-tight seal between the housing 92 and the cylinder head 94.

A cylindrical shaft stop 102 extending axially through the cylinder head 94 includes a threaded portion 104 and a non-threaded portion 106. The threaded portion 104 is threadably received within the cylinder head 94, and projects outwardly beyond the cylinder head. A drive socket receptacle 108 extends axially inwardly from the outer end of the stop 102. A suitable wrench (not shown) may be received in the socket receptacle 108 for rotating the stop 102 in an appropriate direction to cause the stop to advance axially into or retract from the fluid motor 12. A locking nut 110 threadably fitted on the outwardly projecting portion of the shaft stop 102, may be suitably manipulated to bear against the cylinder head 94, thereby preventing the shaft stop 102 from being vibrated from its set position during operation of the fluid motor 12. A conventional O-ring 112 is disposed in an annular cavity formed in the cylinder head 94 about the shaft stop unthreaded portion 106 to provide a fluid-tight seal between the cylinder head and the shaft stop.

The fluid motor 12 is coupled to suitable hydraulic control means (not shown)in the conventional manner for selectively supplying hydraulic fluid under pressure to the tubular housing 92 on either side of the actuating piston 90, while venting the other side to a hydraulic fluid reservoir (not shown).

As best depicted in FIGS. 1 and 7, during operation the pumps 58 supply separate pressurized streams of reactive fluid components from the associated reservoirs 60 to the respective mix head inlet coupler 54. Within the mix head, the separate streams of substituent fluids are directed through the passages 52 and the openings 50 into the pressure adjusting assembly 24, and thence to the respective passages 32.

In FIGS. 2 and 4 the mixing device of the present invention is depicted in its "dispense" mode. Thus, the passages 32 opening into the mixing chamber 16 are free from obstruction, and the separate streams of component fluids are injected into the mixing chamber 16 in an opposed manner and toward the upstream end, each at an acute angle (typically 60 degrees) to the longitudinal axis of the mixing chamber 16. As they are injected, the component fluids impinge upon each other and upon the purge piston face 67, mixing into a homogeneous mixture. Injecting the component fluids angularly toward one another and the closed inner end of the mixing chamber 16 causes superior mixing as well as dissipation of the kinetic energy in the fluid, and results in a homogeneous stream with minimal swirling movements.

In this mode the purge piston 66 is in a retracted position, with the purge piston face 67 positioned between the passages 32 and their associated recycle ports 62, thereby blocking any flow of fluids from the mixing chamber 16 into the recycle ports 62. The recycle sleeve 70 is held in a retracted position by the purge piston 66, compressing the spring 82 against the guide and seal member 84. As the separate streams of component fluids continue to be injected, the resulting homogeneous mixture is displaced toward the outlet 1a of the mixing chamber 16, and thence into a mold cavity (not shown).

For different component fluids having different viscosities and flow characteristics, it is desirable to be able to vary the conditions under which the component fluids are injected into the mixing chamber 16. To this end, a variety of replaceable inserts 26 may be provided, having different diameter passages 32. This variety of passage diameters will result in different pressure drop characteristics for a given flow of a given component fluid. By installing different ones of these inserts in the pressure adjusting assembly 24, desired injection pressures may be provided for various component fluids.

Selective positioning of the valve stem 30 of the pressure adjusting assembly 24 provides additional means of controlling the injection pressure of a component fluid. This additional control is desirable for accommodating variations in the injection process. The replaceable inserts permit a range of discrete injection pressures for a given flow rate of a component fluid. The assembly 24 permits adjustment of the injection pressure to a value intermediate to one of those discrete injection pressures. The flow of a component fluid through an assembly 24 may be completely blocked by advancing the stem 30 inwardly until the conical portion 44 enters and seals the respective passage 32.

Referring now to FIGS. 2 and 5, after a sufficient charge of mixed fluids has been dispensed, pressurized hydraulic fluid is admitted between the actuating piston 90 and the cylinder head 94, while the area between the actuating piston 90 and the member 84 is vented. This causes the actuating piston 90 to advance toward the member 84. The actuating piston 90, acting through the purge shaft 68, thus moves the purge piston 66 from its retracted position toward an extended position at the outlet 18.

This movement initially causes the flow of reactive fluids into the mixing chamber 16 to stop as the passages 32 are blocked by the purge piston 66. The purge piston 66 expels any remaining mixed fluids through the discharge outlet 18 as it advances to its extended position.

As the purge piston 66 moves toward its extended position, the spring 82 causes the recycle sleeve 70 to follow the piston and advance from its retracted position toward the outlet 18. The proximal end 74 of the recycle sleeve 70 remains in contact with the purge piston 66 until the spring pedestal 80 contacts the head frame 10, preventing further movement of the recycle sleeve 70 toward the outlet 18. The recycle sleeve 70 is then in its extended position. The purge piston 66 will continue to move toward its extended position.

FIG. 5 illustrates the mixing head in the "recycle" mode. When the recycle sleeve 70 is in its extended position, the passages 32 are in communication with the axial slots 72, and the flow of component fluids from the passages recommences. Thus, each axial slot 72 is disposed to direct the flow of component fluids from an inlet port 20 to the associated recycle port 62. From each recycle port 62, the separate component fluids return to the associated reservoir 60 via the conduit 64 (FIG. 1).

The axial slots 72 have a greater cross sectional area than their respective passages 32. This greater cross sectional area reduces back pressure so that the pressure of the component fluids in the dispense and recycle modes will be generally uniform. A uniform fluid pressure is desirable for best mixing when the mix head is returned to the "dispense" mode.

When an empty mold is properly in position at the mixing chamber outlet 18, the fluid motor 12 is reversed. Pressurized hydraulic fluid is admitted between the actuating piston 90 and the member 84, while the area between the actuating piston 90 and the cylinder head 94 is vented to permit withdrawal of hydraulic fluid. This causes the actuating piston 90 to move toward the cylinder head 94.

The actuating piston 90, acting through purge shaft 68, moves the purge piston 66 from its extended position toward its retracted position. During the initial portion of this movement, purge piston 66 is not in contact with the recycle sleeve 70 and the recycle sleeve 70 remains in its extended position. After the purge shaft 68 has traveled a significant portion of the distance to its retracted position, the purge piston 66 engages the proximal end 74 of the recycle sleeve 70. The force exerted by the purge piston 66 overcomes the force of the spring 82, and moves the recycle sleeve 70 towards its retracted position, compressing the spring 82.

As the axial slots 72 move out of communication with the respective passages 32, flow from the passages 32 is blocked. The flow remains blocked as first the recycle sleeve 70 and then the purge piston 66 move adjacent to the passages 32. When the purge piston 66 has moved sufficiently toward its retracted position, the passages 32 are unblocked, reinstating the flow of reactive fluids into the mixing chamber 16.

The actuating piston 90 continues to travel toward the cylinder head 94 until it contacts the shaft stop 102. At this point the mixing head has been returned to the "dispense" mode. The shaft stop 102 may be axially positioned within the cylinder head 94 to precisely control the position at which actuating piston 90 stops. The retracted position of the purge piston 66 may thereby be controlled to obtain the optimal geometry of the mixing chamber 16 for various formulations of reactive fluids.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A head for receiving and mixing a plurality of separate reactive fluids and dispensing a homogeneous mixture of the fluids comprising;

a) an elongated mixing chamber including opposite ends and a longitudinal axis, at least two inlet ports, each said inlet port admitting a separate one of a plurality of reactive fluids to the mixing chamber, and means closing off one end of said mixing chamber, the other end of said mixing chamber being open and defining an outlet for dispensing a homogeneous stream of the mixed fluids flowing along said longitudinal axis from the closed end to the open end, and b) nozzle means disposed at each of the inlet ports for receiving the reactive fluid, each said nozzle means including a passage so disposed as to direct the reactive fluid supplied thereto into the mixing chamber in a direction at an acute angle to said longitudinal axis and at least partially upstream against the flow of the homogeneous stream along said longitudinal axis from the closed end to the open end.

2. The invention defined in claim 1, wherein said means closing off one end is moveable along said mixing chamber.

3. The invention defined in claim 1, including means for purging said mixing chamber.

4. The invention defined in claim 3, wherein said means for purging includes a piston constructed and arranged to axially reciprocate within said mixing chamber and means for reciprocating said piston.

5. The invention defined in claim 1, including a recycle port for each inlet port, and recycle means comprising a recycle sleeve constructed and arranged to axially reciprocate within said mixing chamber between a first position in which said inlet ports and recycle ports are in fluid communication with one another, and a second position in which fluid communication is blocked between said inlet ports and recycle ports.

6. A head for receiving and mixing a plurality of separate reactive fluids and dispensing a homogeneous mixture of the fluids comprising:

a) an elongated mixing chamber having a longitudinal axis and opposite ends, means for closing off one end of said mixing chamber, the other end of said mixing chamber being open and defining a mixed fluid outlet for dispensing a homogeneous stream of mixed fluids flowing along said longitudinal axis from the closed end to the open end, at least two inlet ports for admitting separate ones of a plurality of reactive fluids under pressure, and a recycle port for each inlet port;

b) nozzle means removably disposed in each inlet port, each nozzle means including a passage so disposed as to direct the reactive fluids supplied thereto into the mixing chamber in a direction at an acute angle to said longitudinal axis and at least partially upstream against the flow of the homogeneous stream along said longitudinal axis from the closed end to the open end;

c) reciprocating means for purging said mixing chamber including a piston constructed and arranged to axially reciprocate within said mixing chamber and means for reciprocating said piston; and d) recycle means including a sleeve movable axially relative to said piston, and constructed and arranged to axially reciprocate within said mixing chamber between a first position at which each said inlet port is in fluid communication with said recycle port and a second position at which fluid communication between said inlet ports and said recycle ports is blocked.

7. The invention defined in claim 6, wherein said means closing off one end is moveable axially along said mixing chamber, and including means for moving said means closing off to predetermined positions.

8. The invention defined in claim 6, wherein said sleeve includes a passage for each said inlet port and recycle port, each passage being disposed when said sleeve is in said first position to provide fluid communication between said inlet port and recycle port.

9. The invention defined in claim 8, wherein said sleeve includes an outer surface, and each said passage comprises an axially extending slot formed in the outer surface of said sleeve.

10. The invention defined in claim 6, wherein said means for reciprocating said piston comprises a fluid actuated motor and a shaft connecting the fluid actuated motor to said piston, the shaft extending slidingly through said sleeve.

11. The invention defined in claim 6, including means for reciprocating said sleeve comprising a spring disposed to normally bias said sleeve to said first position, said piston for purging said mixing chamber being disposed upon retraction to drive said sleeve against the bias of said spring to said second position.

* * * * *